(12) United States Patent  (10) Patent No.: US 8,684,660 B2
Miranda et al.  (45) Date of Patent: Apr. 1, 2014

(54) PRESSURE AND TEMPERATURE ACTUATION SYSTEM

(75) Inventors: Carlos Miguel Miranda, Greer, SC (US); Edward William Cummings, Greenville, SC (US)

(73) Assignee: General Electric Company, Schenectady, NY (US)

( * ) Notice: Subject to any disclaimer, the term of this patent is extended or adjusted under 35 U.S.C. 154(b) by 436 days.

(21) Appl. No.: 13/164,221

(22) Filed: Jun. 20, 2011

(65) Prior Publication Data

US 2012/0321452 A1  Dec. 20, 2012

(51) Int. Cl.
F01B 25/00 (2006.01)

(52) U.S. Cl.
USPC .............................. 415/17; 415/115; 415/145

(58) Field of Classification Search
USPC .................. 415/17, 115, 145, 199.5; 251/11; 236/92
See application file for complete search history.

(56) References Cited

U.S. PATENT DOCUMENTS

| | | | |
|---|---|---|---|
| 2,787,440 A | 4/1957 | Thompson, Jr. | |
| 3,428,251 A * | 2/1969 | Cooper et al. | 236/92 R |
| 3,575,528 A | 4/1971 | Beam, Jr. et al. | |
| 4,213,738 A | 7/1980 | Williams | |
| 4,217,755 A | 8/1980 | Williams | |
| 4,296,599 A | 10/1981 | Adamnson | |
| 4,414,933 A | 11/1983 | Pribnow | |
| 4,427,149 A | 1/1984 | Adachi | |
| 4,485,842 A | 12/1984 | Rausch | |
| 4,560,105 A | 12/1985 | Jiandani | |
| 4,660,760 A | 4/1987 | Bennett et al. | |
| 4,681,256 A | 7/1987 | Dewhirst | |
| 4,723,704 A | 2/1988 | Muramoto | |
| 4,792,090 A | 12/1988 | Dewhirst | |
| 4,807,433 A | 2/1989 | Maclin et al. | |
| 5,022,817 A | 6/1991 | O'Halloran | |
| 5,137,125 A | 8/1992 | Troltsch et al. | |
| 5,263,643 A | 11/1993 | Wells et al. | |
| 5,921,268 A | 7/1999 | Soares | |
| 5,996,331 A | 12/1999 | Palmer | |
| 6,116,852 A | 9/2000 | Pierre et al. | |
| 6,158,664 A * | 12/2000 | Klann | 236/59 |
| 7,258,524 B2 | 8/2007 | Friedel et al. | |
| 7,445,424 B1 * | 11/2008 | Ebert et al. | 415/113 |
| 8,549,864 B2 | 10/2013 | Langdon, II et al. | |
| 2009/0226301 A1 * | 9/2009 | Priestman et al. | 415/145 |
| 2010/0068039 A1 * | 3/2010 | Winter | 415/145 |
| 2010/0080685 A1 * | 4/2010 | Morgan et al. | 415/47 |
| 2010/0089468 A1 | 4/2010 | Scott et al. | |

* cited by examiner

Primary Examiner — Edward Look
Assistant Examiner — William Grigos
(74) Attorney, Agent, or Firm — Cantor Colburn LLP

(57) ABSTRACT

A pressure and temperature actuation system is provided having a high-temperature low-pressure zone, a low-temperature high-pressure zone, a boundary, a pressure actuated mechanism, and a temperature mechanism. A gas located in the high-temperature low-pressure zone has a greater gas temperature than the gas located in the low-temperature high-pressure zone. The gas located in the low-temperature high-pressure zone has a greater gas pressure than the gas located in the high-temperature low-pressure zone. The boundary separates the high-temperature low-pressure zone from the low-temperature high pressure zone. The pressure actuated mechanism is located within the boundary and is configured for opening at a specified gas pressure in either the high-temperature low-pressure zone or the low-temperature high-pressure zone. The temperature actuated mechanism is located within the boundary and is configured for opening at a specified gas temperature in either the high-temperature low-pressure zone or the low-temperature high-pressure zone.

16 Claims, 8 Drawing Sheets

Valve closed

Valve Open

Valve Open

PRESSURE AND TEMPERATURE ACTUATION SYSTEM

BACKGROUND OF THE INVENTION

The subject matter disclosed herein relates to a pressure and temperature actuation system, and more specifically to a system where a pressure actuated mechanism and a temperature actuated mechanism selectively open to allow for gas flow between a low-temperature high-pressure zone and a high-temperature low-pressure zone.

Gas turbines generally include a compressor, a combustor, one or more fuel nozzles, and a turbine. Air enters the gas turbine through an air intake and is pressurized by the compressor. The pressurized air is then mixed with fuel supplied by the fuel nozzles. The air-fuel mixture is supplied to the combustors at a specified ratio for combustion. The combustion generates pressurized exhaust gases, which drive blades of the turbine.

The efficiency of a gas turbine increases as the temperature of the combustion gas increases. This is because higher temperature combustion gases contain more energy and produce more work as the combustion gases expand within the gas turbine. However, in an effort to maintain the temperature of the internal components of the gas turbine at acceptable levels, cooling air is introduced. For example, the forward wheel space of the turbine located between the nozzle assembly and the compressor exit diffuser of the turbine is subject to elevated temperatures. Other locations in the compressor include, for example, the aft or the last stage wheel space.

Several approaches exist for directing cooling air in the compressor, however each of these approaches have drawbacks. For example, in one approach an open cooling passage is created to allow for cooling air to flow into a desired location, such as the forward wheel space. However, a cooling passage allows for cooling air to enter the forward wheel space at all operating conditions with no flow control, which sometimes results in unwanted extraction of cooling air and corresponding loss in gas turbine performance. In another approach, a dedicated external piping system is provided for supplying cooling air to the forward wheel space. However, this approach may be costly and complex. Therefore, it would be desirable to provide a cost effective system that provides cooling air to a turbine depending on operating pressure or temperature.

BRIEF DESCRIPTION OF THE INVENTION

According to one aspect of the invention, a pressure and temperature actuation system is provided having a high-temperature low-pressure zone, a low-temperature high-pressure zone, a boundary, a pressure actuated valve mechanism, and a temperature valve mechanism. A gas is located in both of the high-temperature low-pressure zone and the low-temperature high-pressure zone. The gas located in the high-temperature low-pressure zone has a greater gas temperature than the gas located in the low-temperature high-pressure zone. The gas located in the low-temperature high-pressure zone has a greater gas pressure than the gas located in the high-temperature low-pressure zone. The boundary separates the high-temperature low-pressure zone from the low-temperature high pressure zone. The pressure actuated valve mechanism is located within the boundary and is configured for opening at a specified gas pressure in the low-temperature high-pressure zone, the high-temperature low-pressure zone, or a pressure differential between the low-temperature high-pressure zone and the high-temperature low-pressure zone. Opening the pressure actuated valve mechanism allows for gas to escape from the low-temperature high-pressure zone into the high-temperature low-pressure zone. The temperature actuated valve mechanism is located within the boundary and is configured for opening at a specified gas temperature in either the low-temperature high-pressure zone or the high-temperature low-pressure zone. Opening the temperature actuated valve mechanism allows for the gas located in the low-temperature high-pressure zone to enter the high-temperature low-pressure zone.

According to another aspect of the invention, a gas turbine is provided. The gas turbine includes a low-pressure zone and a high-pressure zone. A gas is located in both of the low-pressure zone and the high-pressure zone. The gas located in the high-pressure zone has a greater gas pressure than the gas located in the low-pressure zone. A boundary located within the gas turbine separates the low-pressure zone from the high pressure zone. A pressure actuated valve mechanism is located within the boundary and is configured for opening at a specified gas pressure. Opening the pressure actuated valve mechanism allows for gas to escape from the high-pressure zone into the low-pressure zone.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 4 illustrates the valve assembly in a closed position and FIGS. 5-6 illustrate the valve assembly in an open position;

The detailed description explains embodiments of the invention, together with advantages and features, by way of example with reference to the drawings.

DETAILED DESCRIPTION OF THE INVENTION

Figure 1:
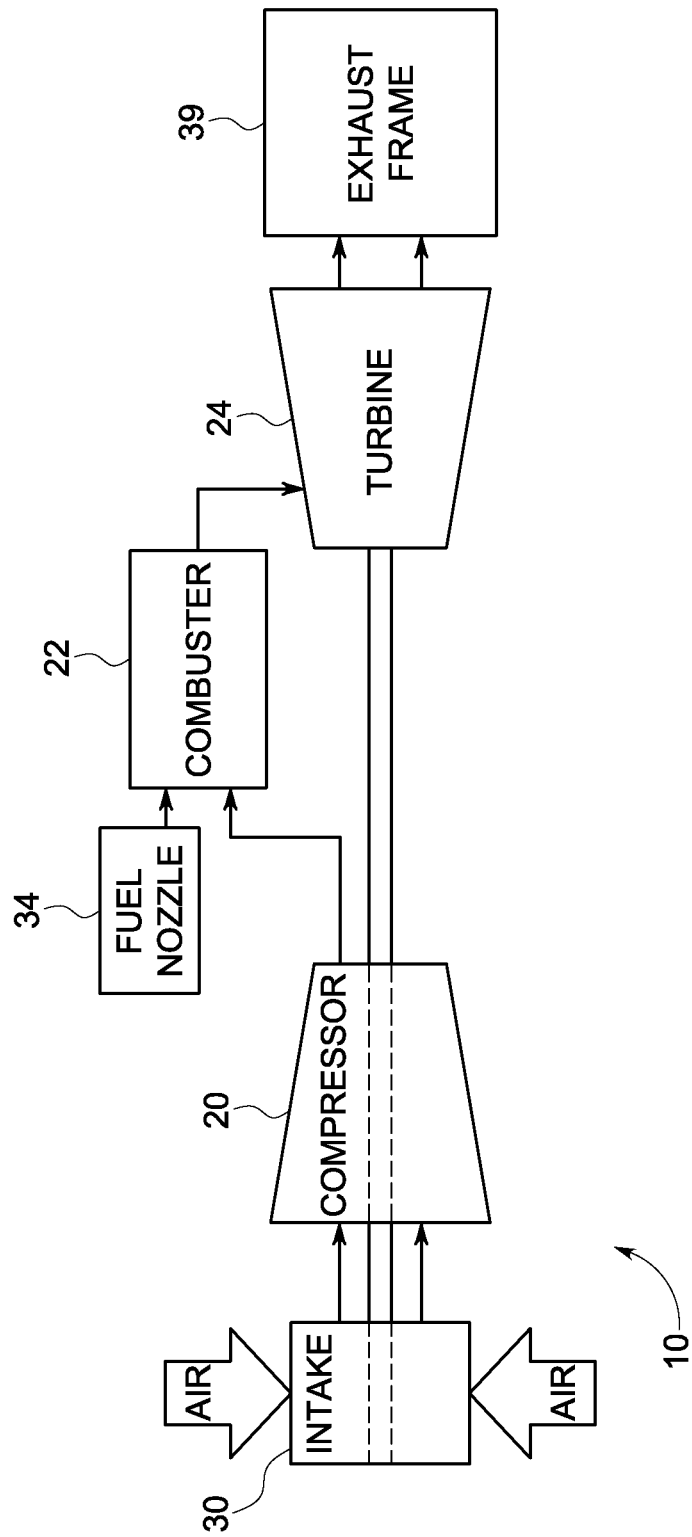
FIG. 1 is a partially cross-sectioned view of an exemplary gas turbine system.

FIG. 1 illustrates an exemplary schematic power generation system indicated by reference number 10. The power generation system 10 is a gas turbine system having a compressor 20, a combustor 22, and a turbine 24. Air enters the power generation system 10 though an air intake 30 located in the compressor 20, and is compressed by the compressor 20. The compressed air is then mixed with fuel by a fuel nozzle 34 of the combustor 22. The fuel nozzle 34 injects an air-fuel mixture into the combustor 22 in a specific ratio for combustion. The combustion generates hot pressurized exhaust gases that drives blades (not shown) that are located within the turbine 24. Hot gas exits the turbine 24 and enters the exhaust section or exhaust frame 39.

Figure 2:
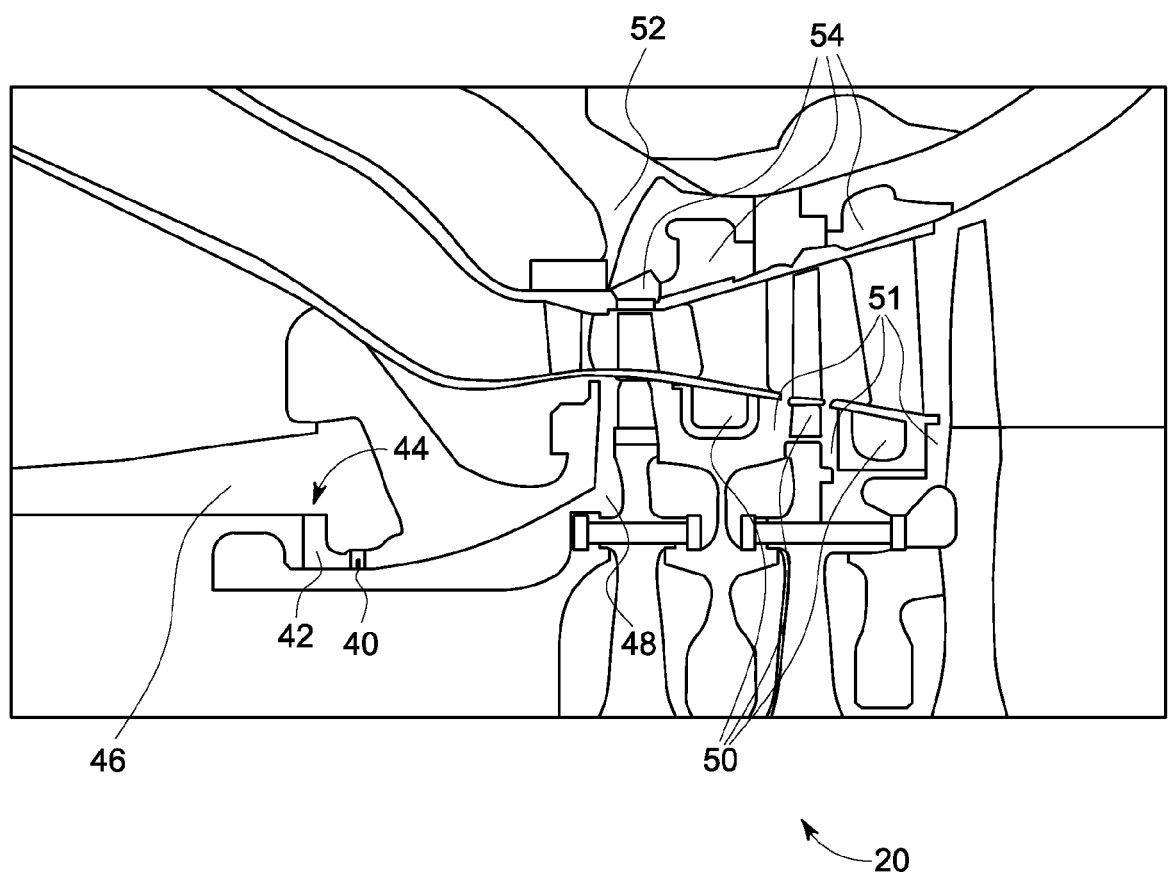
FIG. 2 is a cross-sectioned view of a portion of a compressor, a combustor, and a turbine section shown in FIG. 1.

FIG. 2 is an enlarged view the compressor 20, the combustor 22 and the turbine 24 illustrating one exemplary embodiment of a valve assembly 40. In the embodiment as shown in FIG. 2, the valve assembly 40 is positioned in a boundary or wall 42 of the compressor discharge case 44. The wall separates a low-temperature high-pressure zone, such as a plenum 46, from a high-temperature low pressure zone, such as a forward wheel space 48. The plenum 46 is typically where high pressure compressor discharge air is located. The temperature of the air in the plenum 46 is lower than the temperature of the air located in the forward wheel space. However, the pressure of the air located in the plenum 46 is greater than the pressure of the air or gas located in the wheel space 48.

Although FIG. 2 illustrates the valve assembly 40 located between the plenum 46 and the forward wheel space 48, it is understood that the valve assembly may be located in other locations within the power generation system 10 as well. Specifically, the valve assembly 40 may be placed in any boundary separating areas where a pressure differential and a temperature differential exist. For example, referring to FIG. 2, in an alternative embodiment the valve assembly 40 may be positioned between any one of a plurality of turbine nozzle diaphragm cavities 50 and the adjoining wheel space areas 51. In another embodiment, the valve assembly 40 may be placed within the turbine casing 52 between two turbine cavities 54.

Figure 3:
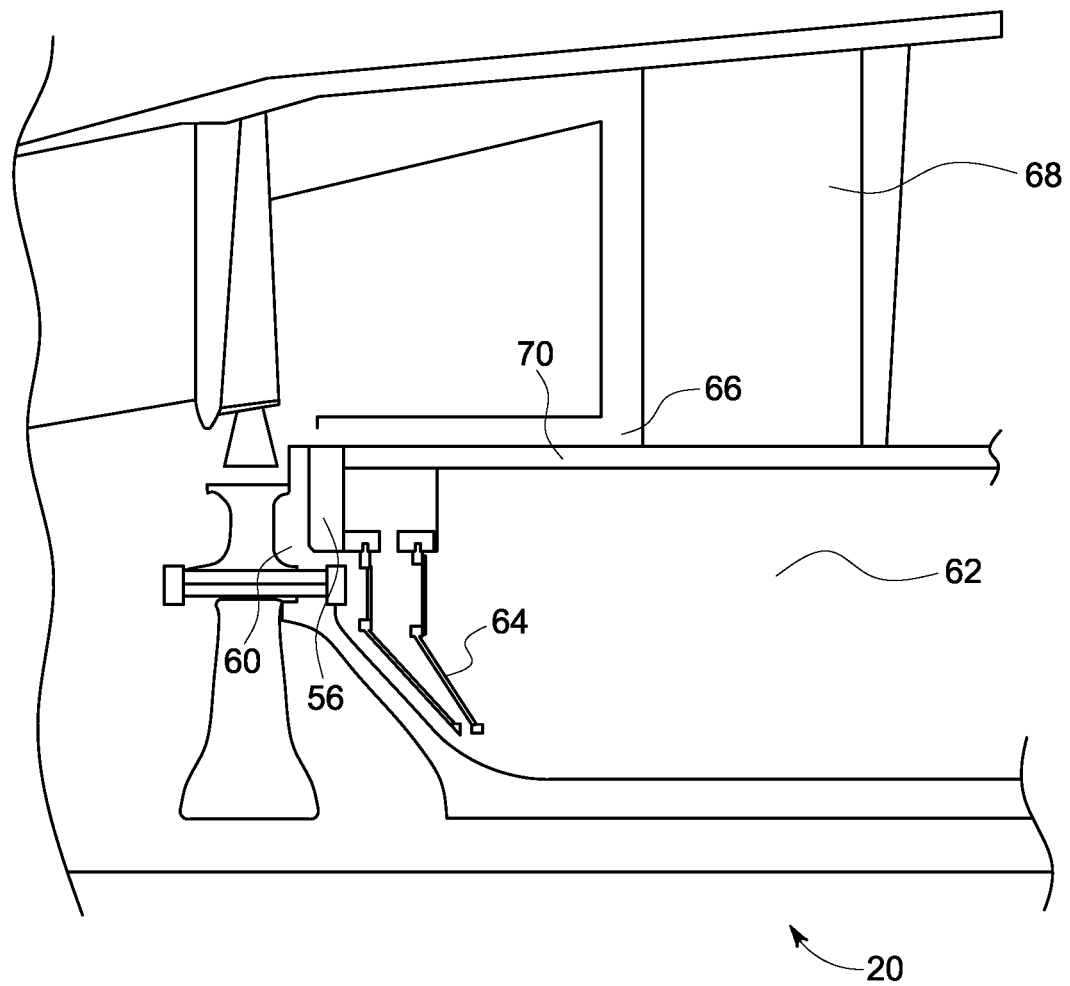
FIG. 3 is a cross-sectioned view of an exhaust section shown in FIG. 1.

Turning now to FIG. 3, which is an enlarged view of another portion of the exhaust section 39, the valve assembly 40 could also be placed in a boundary or wall 56 separating an aft wheel space 60 from a bearing cavity 62. In another embodiment, the valve assembly 40 could be placed in a vane 64 located in the bearing cavity 62. In yet another embodiment, the valve assembly 40 could be placed in a wall 70 between the bearing cavity 62 and an exhaust airfoil cooling cavity 66. It should be noted that while FIGS. 1-3 illustrate the valve assembly 40 employed in a gas turbine system, it is understood that the valve assembly 40 could be employed in other applications as well. For example, in another embodiment, the valve assembly could be located within an internal combustion engine. In an internal combustion engine, the valve assembly could be employed for air extraction that affects fuel to air ratio for emissions control, cooling of components or parts exposed to elevated temperatures, over-pressure in a combustor section, and to substantially prevent the unwanted loss of gas by providing shut-off capability.

Figure 4:
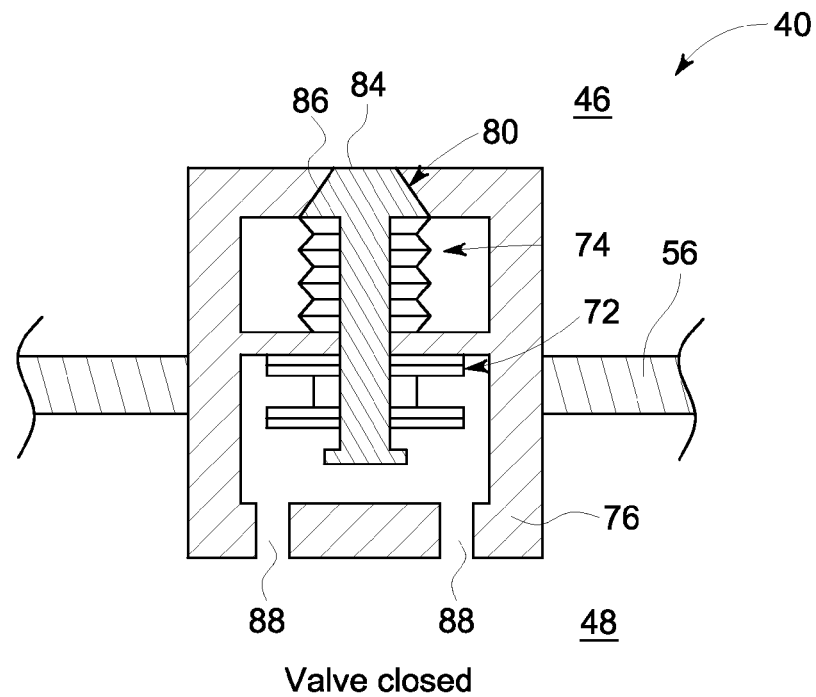
FIGS. 4-6 are an illustration of a valve assembly, where
Figure 5:
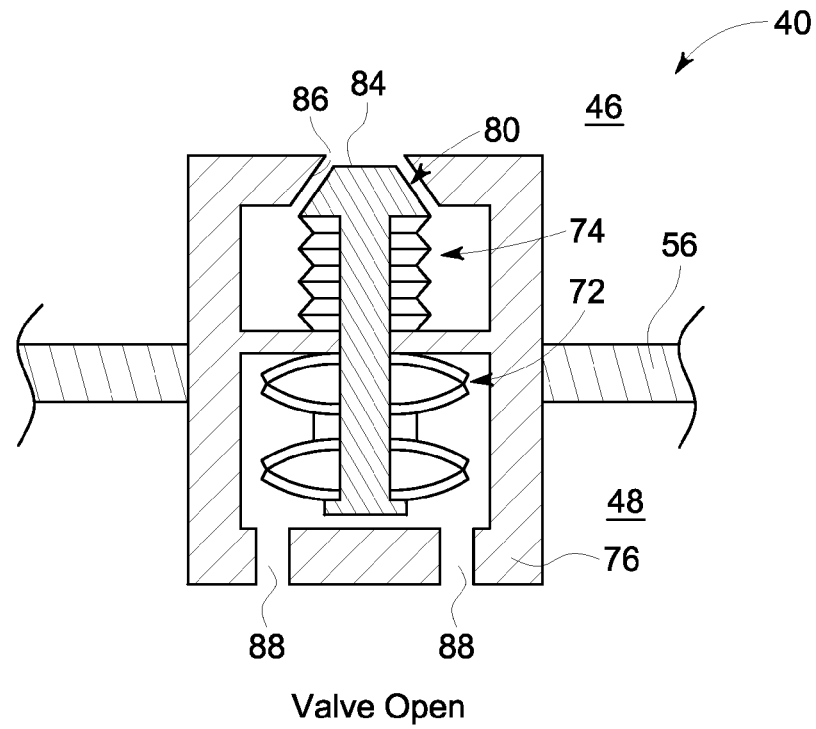
Figure 6:
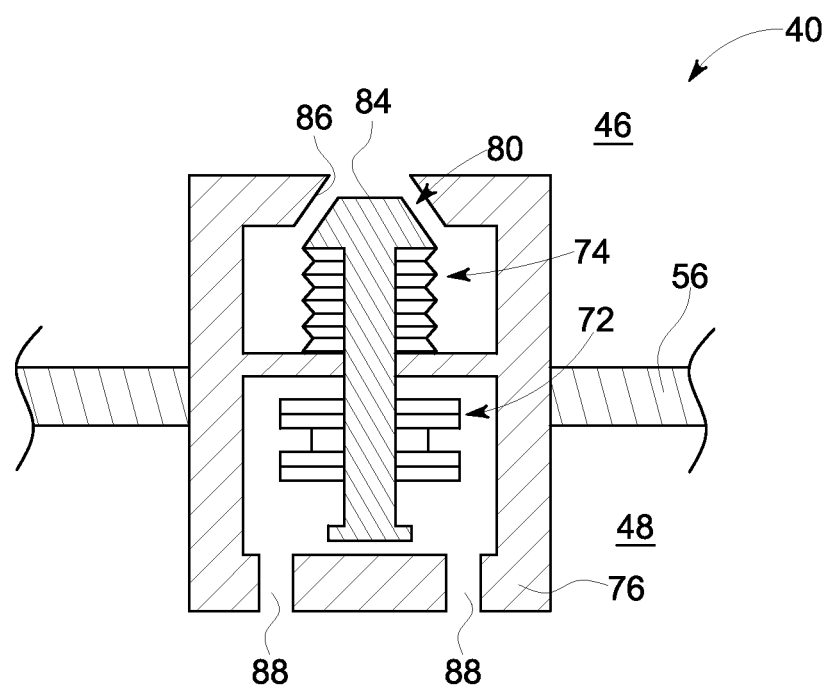
Figure 7:
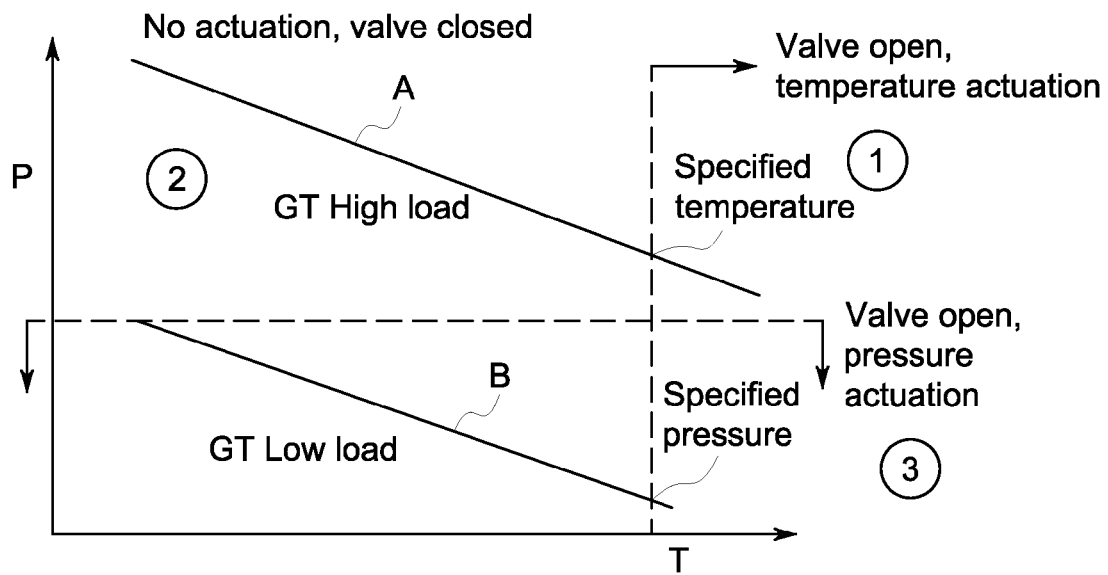
FIG. 7 is a diagram illustrating operation of the valve assembly shown in FIGS. 4-6.

Turning now to FIGS. 4-6, an exemplary schematic illustration of a valve assembly 40 is shown located within the wall 56 is shown. In the embodiment as shown, the valve assembly 40 is a combined temperature actuated mechanism 72 and a pressure actuated mechanism 74 which make up a single, unitary valve, however it is understood that in another embodiment the temperature actuated mechanism 72 and the pressure actuated mechanism 74 could be placed in separate valves, or in the same valve assembly where the temperature and pressure actuated mechanisms 72, 74 could be actuated independently of one another. Alternatively, actuation of the temperature and pressure actuated mechanisms 72, 74 may be dependent on one another as well. An illustration of the combined valve is illustrated in FIG. 7. Moreover, a plurality of temperature actuated mechanisms and pressure actuated mechanisms that work together may be employed to modulate cooling air and for extraction of gasses.

Referring to FIG. 4, the valve assembly 40 includes the temperature actuated mechanism 72, the pressure actuated mechanism 74, a valve housing 76, and a valve plunger or disk 80. The temperature activated mechanism 72 is typically a valve mechanism that actuates to regulate the flow of gas based on a change in temperature, and includes temperature sensitive elements such as, for example, a bimetallic element or a liquid-filled bellows. Although the disk 80 is shown, the valve assembly 40 may also be various types of valve mechanisms for modulating the flow of gas such as, for example, a spring loaded pintle, a ball and stopper, or a butterfly plate valve. In the exemplary embodiment as shown, the temperature sensitive element is a bimetallic element. FIG. 4 illustrates the valve in a closed position, where a top portion 84 of the disk 80 seats against an opening 86 in the housing 76. In the closed position, gas is generally unable to escape from the low-temperature high-pressure zone 46 and into the high-temperature low-pressure zone 48. When the temperature of the gas located within the low-temperature high-pressure zone 46 reaches a specified temperature, then the temperature actuated mechanism 72 creates a mechanical displacement that unseats the top portion 84 of the disk 80, and the valve assembly 40 is actuated into an open position as shown in FIG. 5. Specifically, as shown in FIG. 5, the bimetallic elements activate from a generally horizontal arrangement into a generally arcuate arrangement to cause the top portion 84 of the disk 80 to pull away from the opening 86. Alternatively, in another embodiment when the temperature of the gas located in the high-temperature low-pressure zone 48 reaches a specified temperature, the temperature activated mechanism 72 is actuated, and the valve assembly 40 is opened.

When in the opened position, the valve assembly 40 allows for gas from the low-temperature high-pressure zone 46 to enter the high-temperature low-pressure zone 48 during specific operating conditions of the power generation system 10. Specifically, in one embodiment the temperature actuated mechanism 72 is configured to open at the specified temperature during high load gas turbine conditions. The valve assembly 40 is located between the low-temperature high-pressure zone 46 and the high-temperature low-pressure zone 48. The low-temperature high pressure zone 46 typically contains high-pressure cooling air to relieve high temperatures and cool turbine or other types of components. Specifically, the temperature activated mechanism 72 of the valve assembly 40 is actuated into the open position to allow for the high-pressure cooling air located in the low-temperature high-pressure zone 46 to enter the high-temperature low-pressure zone 48 through the exit passageways 88. In one example, the valve assembly 40 is opened if the specified temperature of the low-temperature high-pressure zone or plenum 46 (shown in FIG. 2) is between about 300° C. to about 450° C., which correlates to component metal temperatures in the high-temperature low-pressure zone 48.

Opening of the valve assembly 40 facilitates cooling of the components located within the high-temperature low-pressure zone 48 during elevated ambient temperatures and gas turbine high load conditions by allowing cooling air from the low-temperature high-pressure zone 46 into the high-temperature low-pressure zone 48. The temperature activated mechanism 72 typically remains in the opened position under constant temperatures until the temperature of the gas located within the low-temperature high-pressure zone 46 or the high-temperature low-pressure zone 48 drops below the specified temperature. Specifically, the temperature activated mechanism 72 is actuated to re-seat the top portion 84 of the disk 80 into the closed position shown in FIG. 4 if the temperature of the gas located within the low-temperature high-pressure zone 46 or the high-temperature low-pressure zone 48 drops below the specified temperature. Therefore, the valve assembly 40 allows for modulation of cooling air into the high-temperature low-pressure zone 48 during elevated ambient temperatures and gas turbine high load operation, and is actuated into the closed position during lower ambient temperatures or gas turbine reduced load operation. Closing the valve assembly 40 during colder ambient temperatures or reduced load operation will reduce performance losses by generally preventing unwanted cooling air from entering the high-temperature low-pressure zone 48.

The pressure activated mechanism 74 is typically a valve mechanism that actuates to regulate the flow of gas based on a change in pressure, and includes pressure sensitive elements such as, for example, a bellows or a diaphragm. In the exemplary embodiment as shown, the pressure sensitive element is a moveable set of bellows. FIG. 4 illustrates the valve in the closed position, where gas is generally unable to escape between the low-temperature high-pressure zone 46 and the high-temperature low-pressure zone 48. When the pressure of the gas located within the low-temperature high-pressure zone 46 or the high-temperature low-pressure zone 48 reaches a specified pressure, then the pressure actuated mechanism 74 is actuated to unseat the top portion 84 of the disk 80, and the valve assembly 40 is actuated into the open position, as shown in FIG. 6. Specifically, the pressure sensitive bellows contracts to pull away from the opening 86. In another embodiment, the pressure actuated mechanism 74 is actuated and the valve assembly 40 opens depending on a pressure differential between the low-temperature high-pressure zone 46 and the high-temperature low-pressure zone 48.

When in the opened position, the valve assembly 40 allows for gas from the low-temperature high-pressure zone 46 to enter the high-temperature low-pressure zone 48. Airflow extraction of the combustor 22 is sometimes needed during specific operating conditions of the turbine 24. For example, in one embodiment, during a turndown mode of the power generation system 10, airflow extraction out the plenum 46 (shown in FIG. 2) is needed in an effort to reduce emissions. Thus the pressure activated mechanism 74 of the valve assembly 40 is actuated into the open position to allow for the hot gas or air located in the plenum 46 to escape into the forward wheel space 48. In one example, the valve assembly 40 is opened if the specified pressure of the plenum or the low-temperature high-pressure zone 46 is below about 520 KPa. Opening of the valve assembly 40 allows for extraction of the gasses inside of the plenum 46 when the forward wheel space 48 is at a relatively low pressure. The pressure activated mechanism 74 is actuated to re-seat the top portion 84 of the disk 80 into the closed position shown in FIG. 4 if the pressure of the gas located within the low-temperature high-pressure zone 46 is above the specified pressure.

FIG. 7 is an exemplary diagram illustrating the operation of the valve assembly 40. The diagram illustrates temperature (T) on the x-axis and pressure (P) on the y-axis. In the embodiment as shown, the power generation system 10 (FIG. 1) includes a gas turbine high load operating condition that is shown by a high load line A and a gas turbine low load operating shown by a low load line B. The valve assembly 40 (FIGS. 4-6) includes three different operating conditions. In the first operating condition indicated as reference number 1, the temperature activated mechanism 72 actuates the valve assembly 40 into the open position (FIG. 5) to allow for cooling during high load operating conditions. Specifically, the valve assembly 40 allows for gas from the low-temperature high-pressure zone 46 to enter the high-temperature low-pressure zone 48 when the power generation system 10 is operating at the high load conditions indicated by the high load line A. The temperature activated mechanism 72 opens when the temperature (T) of the gas located in the low-temperature high-pressure zone 46 or the high-temperature low-pressure zone 48 reaches the specified temperature. In a second operating condition indicated by reference number 2, both of the temperature activated mechanism 72 and the pressure activated mechanism 74 are both actuated such that the valve assembly 40 is in the closed position shown in FIG. 4. In a third operating condition indicated by reference number 3, the pressure activated mechanism 74 of the valve assembly 40 actuates the valve assembly 40 into the open position (FIG. 6) to allow for gas extraction. Specifically, the valve assembly 40 allows for gas from the low-temperature high-pressure zone 46 to enter the high-temperature low-pressure zone 48 when the power generation system 10 is operating at the low load conditions indicated by the low load line B. The pressure activated mechanism 74 opens when the pressure (P) of the gas located in the high-temperature low-pressure zone 46 or the high-temperature low-pressure zone 48 reaches the specified pressure. Alternatively, the pressure actuated mechanism 74 opens depending on a pressure differential between the low-temperature high-pressure zone 46 and the high-temperature low-pressure zone 48.

Figure 8:
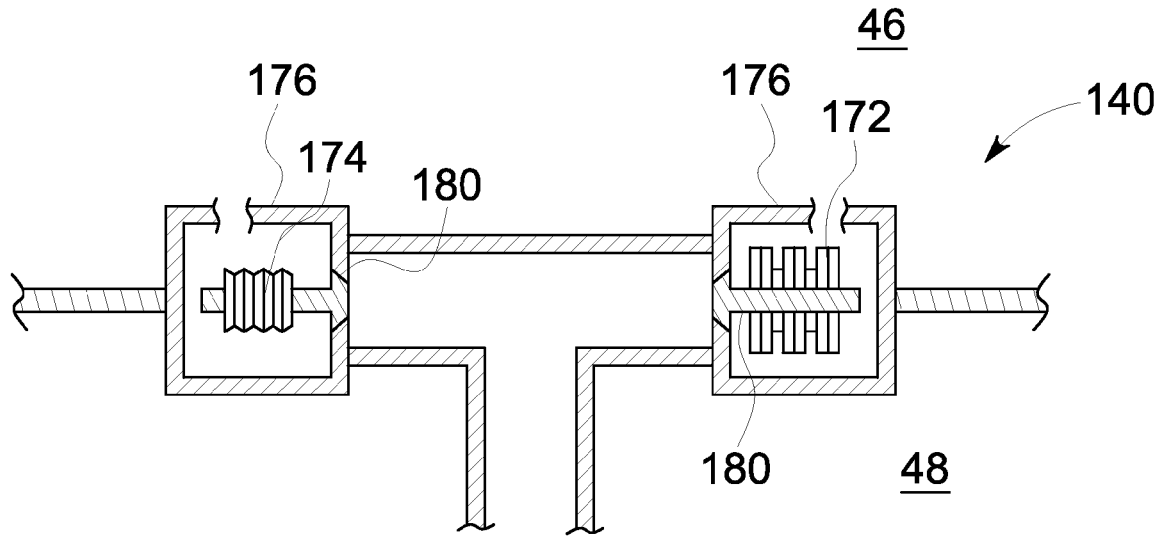
FIG. 8 is an alternative embodiment of the valve assembly shown in FIGS. 4-6.

Turning now to FIG. 8, an alternative schematic illustration of a valve assembly 140 is shown. The valve assembly 140 includes a separate temperature actuated mechanism 172 and a separate pressure actuated mechanism 174 that work together to allow for the valve assembly 140 to modulate cooling air into the high-temperature low-pressure zone 48 during elevated ambient temperatures and gas turbine high load operation, and also allows for extraction of the from the low-temperature high-pressure zone 46 during gas turbine low load operation. The temperature actuated mechanism 172 and the pressure actuated mechanism 174 each include a valve housing 176 and a valve plunger or disk 180.

Figure 9:
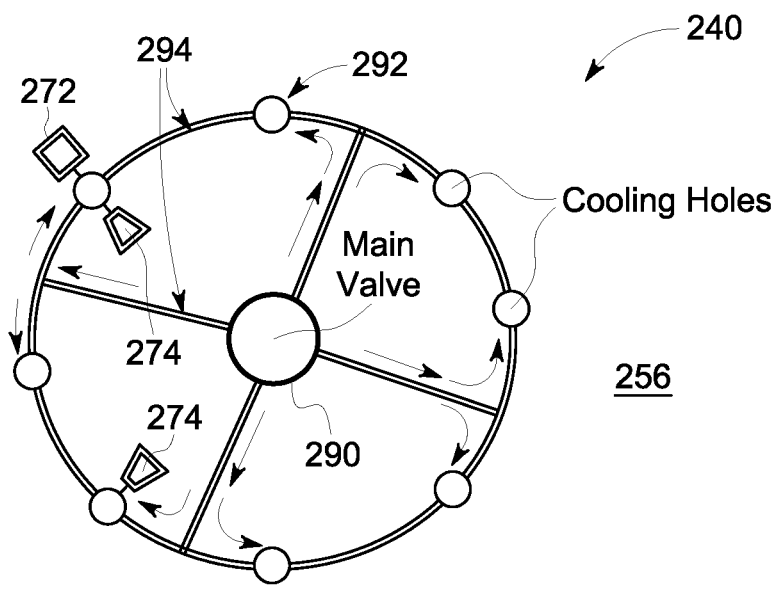
FIG. 9 is an illustration of one configuration of the valve assembly shown in FIGS. 4-6.

The valve assembly 40 may include different configurations as well. FIG. 9 is a schematic illustration of one embodiment of the valve assembly 240. The valve assembly 240 is located within a wall 256. In the embodiment as shown, a main valve portion 290 includes the temperature actuated mechanism (not shown) and the pressure actuated mechanism (not shown) that work together to allow for the valve assembly 140 to modulate cooling air into the high-temperature low-pressure zone 48 (shown in FIGS. 4-6) during elevated ambient temperatures and allows for extraction of the gasses out of the low-temperature high-pressure zone 46 (shown in FIG. 4-6) as well. In the embodiment as shown, a plurality of cooling holes 292 are arranged in a generally circular pattern around the main valve portion 290, however it is understood that the cooling holes 292 could be arranged in other configurations as well. A series of passageways 294 fluidly connect the main valve assembly 290 to the cooling holes 292. This valve arrangement will allow for gas to flow through one of more of the cooling holes 292 from a remotely mounted main valve portion 290. In one embodiment, a secondary temperature actuated mechanism 272, a secondary pressure actuated mechanism 274, or both could also be mounted to one or more of the cooling holes 292. In this configuration, the main valve portion 292 could actuate based on a first condition, where gas would flow into the passageways and to the secondary temperature 272 or pressure actuated mechanism 274. The secondary temperature actuated mechanism 272 or the secondary pressure actuated mechanism 274 could then actuate based on a second condition.

Figure 10:
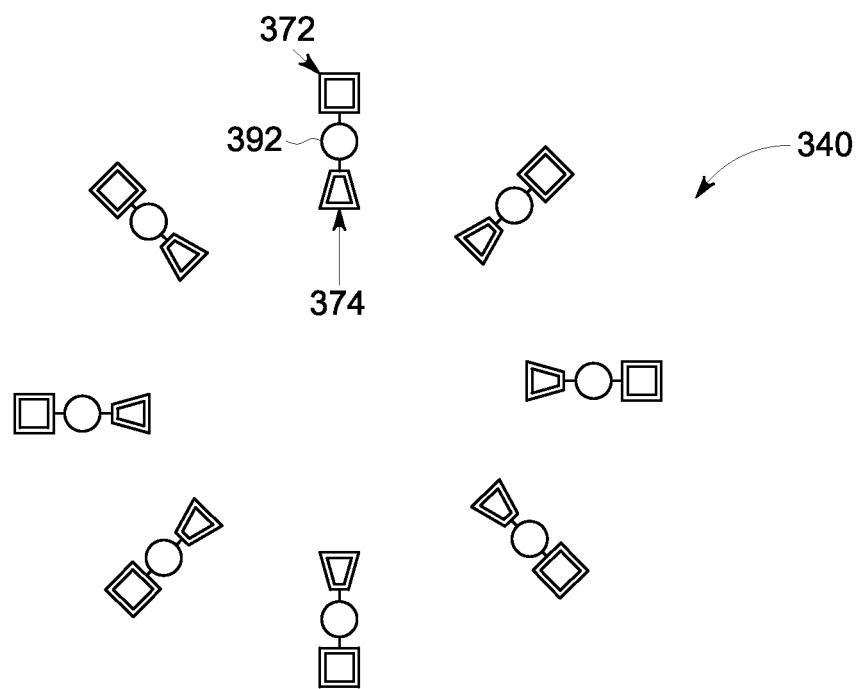
FIG. 10 illustrates another embodiment of a configuration of the valve assembly shown in FIGS. 4-6.

In another embodiment shown in FIG. 10, a plurality of cooling holes 392 are each provided with a temperature actuated mechanism 372 and a pressure actuated mechanism 374. The temperature actuated mechanism 372 and pressure actuated mechanism 374 are both mounted to a corresponding one of the cooling holes 392. In the embodiment as shown, the temperature actuated mechanisms 372 and pressure actuated mechanisms 374 are arranged in a generally circular pattern, however it is understood that the temperature actuated mechanisms 372 and the pressure actuated mechanisms 374 may be arranged in other configurations as well.

Figure 11:
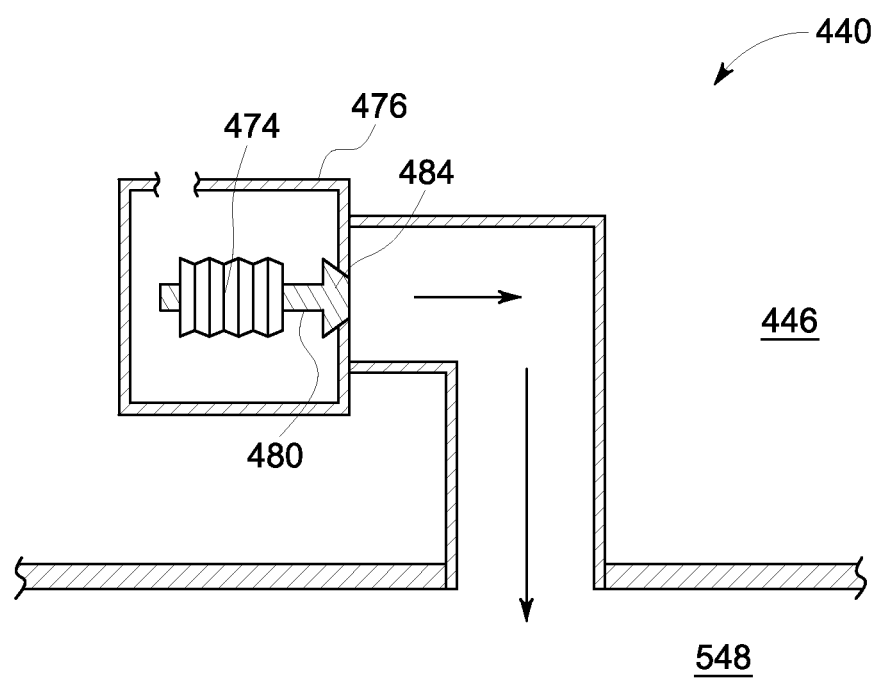
FIG. 11 is yet another embodiment of a valve assembly.

In yet another embodiment, a pressure actuated valve 440 is shown in FIG. 11. The pressure actuated valve assembly 440 may be located in a variety of locations within the power generation system 10 (shown in FIG. 1). Specifically, the valve assembly 440 may be placed in any boundary separating areas where a pressure differential exists. For example, the valve assembly 440 may be positioned in any of the locations as shown in FIGS. 2-3, such as, for example between any one of the plurality of turbine nozzle diaphragm cavities 50 and the adjoining wheel space areas 51, within the turbine casing 52 between two turbine cavities 54, in the wall 56 separating an aft wheel space 60 from the bearing cavity 62, in the vane 64 located in the bearing cavity 62, or in the wall 70 between the bearing cavity 62 and the exhaust airfoil cooling cavity 66.

In the embodiment as shown, the valve assembly 440 includes a pressure actuated mechanism 474, a valve housing 476, and a valve plunger or disk 480. The pressure activated mechanism 474 is typically any type of valve mechanism that actuates due to a change in pressure and includes pressure sensitive elements such as, for example, a bellows or a diaphragm. FIG. 11 illustrates the valve assembly 440 in the closed position, where gas is generally unable to escape between a high-pressure zone 446 and a low-pressure zone 448. In one embodiment, when the pressure of the gas located within the high-pressure zone 446 reaches a specified pressure, then the pressure actuated mechanism 474 is actuated to unseat a top portion 484 of the disk 480, and the valve assembly 440 is actuated into an open position (not shown).

When in the opened position, the valve assembly 440 allows for gas from the high-pressure zone 446 to enter the low-pressure zone 448. Airflow extraction in the combustor 22 (FIG. 1) is sometimes needed during specific operating conditions of the turbine 24. For example, in one embodiment, during a turndown mode of the power generation system 10, airflow extraction out the plenum 46 (shown in FIG. 2) is needed in an effort to reduce emissions. Thus the pressure activated mechanism 474 of the valve assembly 440 is actuated into the open position to allow for the hot gas or air located in the plenum 46 to escape into the forward wheel space 48. In one example, the valve assembly 440 is opened if the specified pressure of the plenum or the low-temperature high-pressure zone 46 is below about 560 KPa. Opening of the valve assembly 440 allows for extraction of the gasses inside of the plenum 46 during gas turbine turndown low load operating conditions. The pressure activated mechanism 474 is actuated to re-seat the top portion 484 of the disk 480 into the closed position if the pressure of the gas located within the high-pressure zone 446 is above the specified pressure.

In another embodiment, the valve assembly 440 may be used as an over-pressure valve. That is, gasses trapped in the high-pressure zone 448 may be able to escape into the low-pressure zone 448 if the gas pressure of the high-pressure zone 446 is above a certain threshold value. Specifically, if the gas temperature of the high-pressure zone 446 exceeds a specified pressure limit, then the valve assembly 440 is opened. In one example, if the specified pressure limit of the high-pressure zone 446 is below about 2100 KPa then the pressure activated mechanism 474 is actuated into the open position. The specified pressure limit is based on the operating limits of the gas turbine for safe operation. Opening of the valve assembly 440 allows for extraction of the gasses inside of the plenum 46 during relatively high pressures. The pressure activated mechanism 474 is actuated to re-seat the top portion 484 of the disk 480 into the closed position if the pressure of the gas located within the high-pressure zone 446 is below the specified pressure limit.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A pressure and temperature actuation system, comprising:
   a high-temperature low-pressure zone and a low-temperature high-pressure zone, a gas being located in both of the high-temperature low-pressure zone and the low-temperature high-pressure zone, the gas located in the high-temperature low-pressure zone having a greater gas temperature than the gas located in the low-temperature high-pressure zone, and the gas located in the low-temperature high-pressure zone having a greater gas pressure than the gas located in the high-temperature low-pressure zone;
   a boundary separating the high-temperature low-pressure zone from the low-temperature high pressure zone;
   a pressure actuated mechanism located within the boundary and configured for opening at a specified gas pressure in one of the low-temperature high-pressure zone and the high-temperature low-pressure zone, wherein opening the pressure actuated mechanism allows for gas to escape from the low-temperature high-pressure zone into the high-temperature low-pressure zone; and
   a temperature actuated mechanism located within the boundary and configured for opening at a specified gas temperature in one of the low-temperature high-pressure zone, the high-temperature low-pressure zone, and a pressure differential between the low-temperature high-pressure zone and the high-temperature low-pressure zone, wherein opening the temperature actuated mechanism allows for the gas located in the low-temperature high-pressure zone to enter the high-temperature low-pressure zone, and a cooling flow being provided to the high-temperature low pressure zone as the gas travels from the low-temperature high-pressure zone to the high-temperature low pressure zone, wherein the pressure actuated mechanism and the temperature actuated mechanism are both fluidly connected to a passageway in communication with a plurality of cooling holes located in the boundary, the passageway connecting the high-temperature low-pressure zone and the low-temperature high-pressure zone, at least one of another pressure actuated mechanism and another temperature actuated mechanism being located within at least one of the plurality of cooling holes.

2. The pressure and temperature actuation system of claim 1, wherein the specified temperature occurs during at least one of high ambient conditions and gas turbine high load operating conditions.

3. The pressure and temperature actuation system of claim 1, wherein the specified pressure is based at least in part by a gas turbine turndown low load operation condition.

4. The pressure and temperature actuation system of claim 1, wherein the pressure actuated mechanism and the temperature actuated mechanism are combined into a single, unitary valve and are actuated in a configuration that is one of independent of one another and dependent on one another.

5. The pressure and temperature actuation system of claim 1, wherein the pressure actuated mechanism and the temperature actuated mechanism are each separate valves.

6. A turbine, comprising:
a high-temperature low-pressure zone and a low-temperature high-pressure zone, a gas being located in both of the high-temperature low-pressure zone and the low-temperature high-pressure zone, the gas located in the high-temperature low-pressure zone having a greater gas temperature than the gas located in the low-temperature high-pressure zone, the gas located in the low-temperature high-pressure zone having a greater gas pressure than the gas located in the high-temperature low-pressure zone;
a boundary located within the turbine and separating the high-temperature low-pressure zone from the low-temperature high pressure zone;
a pressure actuated mechanism located within the boundary and configured for opening at a specified gas pressure differential between the low-temperature high-pressure zone and the high-temperature low-pressure zone, wherein opening the pressure actuated mechanism allows for gas to escape from the low-temperature high-pressure zone into the high-temperature low-pressure zone; and
a temperature actuated mechanism located within the boundary and configured for opening at a specified gas temperature in the low-temperature high-pressure zone and the high-temperature low-pressure zone, wherein opening the temperature actuated mechanism allows for the gas located in the low-temperature high-pressure zone to enter the high-temperature low-pressure zone, and a cooling flow being provided to the high-temperature low pressure zone as the gas travels from the low-temperature high-pressure zone to the high-temperature low pressure zone, wherein the pressure actuated mechanism and the temperature actuated mechanism are both fluidly connected to a passageway in communication with a plurality of cooling holes located in the boundary, the passageway connecting the high-temperature low-pressure zone and the low-temperature high-pressure zone, at least one of another pressure actuated mechanism and another temperature actuated mechanism being located within at least one of the plurality of cooling holes.

7. The turbine of claim 6, wherein the boundary separates one of a plenum and a forward wheel space, a turbine nozzle diaphragm and a wheel-space area, two opposing turbine cavities, an aft wheel space and a bearing cavity, and the bearing cavity and an exhaust airfoil cooling cavity.

8. The turbine of claim 6, wherein the gas located within the high-pressure low temperature zone is a cooling air.

9. The turbine of claim 6, wherein the specified temperature is occurs during at least one of high ambient conditions and gas turbine high load operating conditions.

10. The turbine of claim 6, wherein the specified pressure differential is based at least in part by a gas turbine turndown low load operation condition.

11. The turbine of claim 6, wherein the pressure actuated mechanism and the temperature actuated mechanism are combined into a single, unitary valve and are actuated in a configuration that is one of independent of one another and dependent on one another.

12. The turbine of claim 6, wherein the pressure actuated mechanism and the temperature actuated mechanism are separate valves.

13. A gas turbine, comprising:
a high temperature low-pressure zone and a low temperature high-pressure zone, a gas being located in both of the high temperature low-pressure zone and the low temperature high-pressure zone, the gas located in the low temperature high-pressure zone having a greater gas pressure than the gas located in the high temperature low-pressure zone;
a boundary located within the gas turbine and separating the high temperature low-pressure zone from the low temperature high pressure zone;
a pressure actuated valve mechanism located within the boundary and configured for opening at a specified gas pressure, wherein opening the pressure actuated valve mechanism allows for the gas to escape from the low temperature high-pressure zone into the high temperature low-pressure zone;
a temperature actuated mechanism located within the boundary and configured for opening at a specified gas temperature in the low-temperature high-pressure zone and the high-temperature low-pressure zone, wherein the pressure actuated mechanism and the temperature actuated mechanism are both fluidly connected to a passageway in communication with a plurality of cooling holes located in the boundary, the passageway connecting the high-temperature low-pressure zone and the low-temperature high-pressure zone, at least one of another pressure actuated mechanism and another temperature actuated mechanism being located within at least one of the plurality of cooling holes.

14. The turbine of claim 13, wherein the specified pressure is measured within the low temperature high-pressure zone, and wherein the specified pressure is below a value based on a gas turbine turndown low load operating condition.

15. The turbine of claim 13, wherein the pressure actuated valve mechanism is an over-protection valve, and the specified pressure is a pressure limit measured in the low temperature high-pressure zone.

16. The turbine of claim 15, wherein the pressure limit is set based on the operating limits of the gas turbine.

* * * * *